A. BENSON.
VEHICLE.
APPLICATION FILED MAY 1, 1914.
1,259,592.
Patented Mar. 19, 1918.
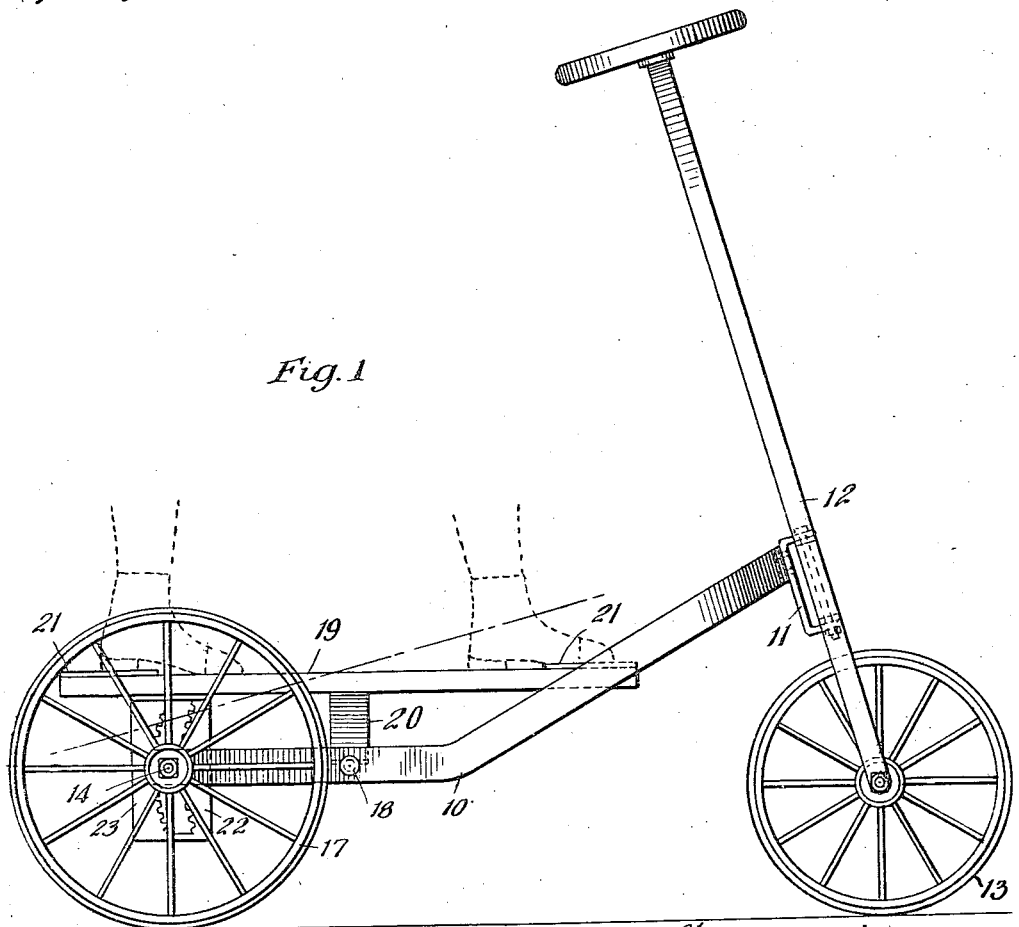
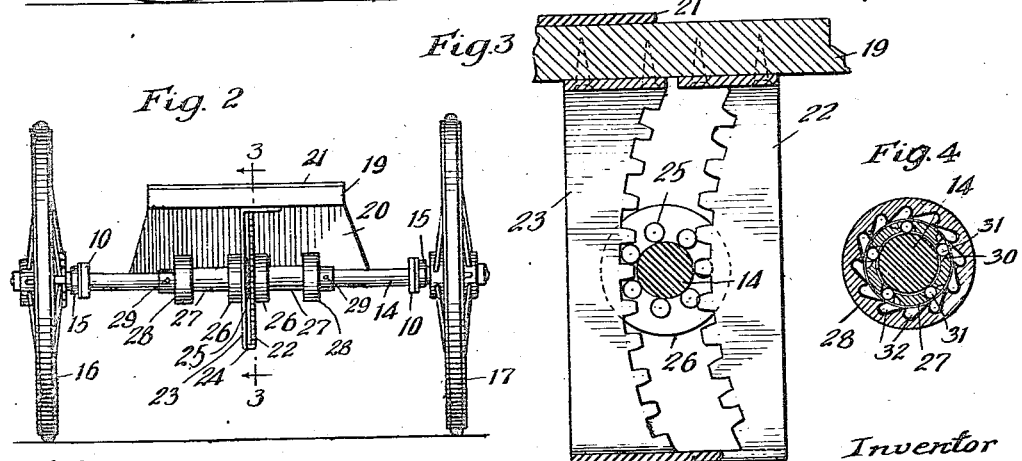
Witnesses:
Wm. Geiger
Joseph Harris
Inventor
Andrew Benson
By Munday, Evarts, Adcock & Clarke
his Attys.

UNITED STATES PATENT OFFICE.

ANDREW BENSON, OF CHICAGO, ILLINOIS, ASSIGNOR, BY MESNE ASSIGNMENTS, TO JANESVILLE PRODUCTS COMPANY, OF JANESVILLE, WISCONSIN, A CORPORATION OF WISCONSIN.

VEHICLE.

1,259,592.  Specification of Letters Patent.  Patented Mar. 19, 1918.

Application filed May 1, 1914. Serial No. 835,602.

*To all whom it may concern:*

Be it known that I, ANDREW BENSON, a citizen of the United States, residing in Chicago, in the county of Cook and State of Illinois, have invented a new and useful Improvement in Vehicles, of which the following is a specification.

This invention relates to improvements in vehicles and a vehicle adapted more particularly for children which may be propelled by the user alternately transferring his weight from one foot to another.

Numerous attempts have been made to design a vehicle of the type indicated but, so far as I am aware, the same have proved more or less deficient in that they either employ driving mechanisms which are complicated, expensive, or so arranged that the parts may assume a dead center condition. Other prior devices of the class indicated have proved unsatisfactory for the reason that they are not adapted for children of different ages and weights; are not so arranged that the operator can vary the propelling to suit the individual requirements; or are not so arranged that the user may rest or coast whenever desired and still be carried by the vehicle.

The object of my invention is to provide a vehicle of simple and practical form which avoids all of the objections above noted; which is so arranged that a direct drive to the traction wheel is employed; which is capable of developing a high speed; which may be propelled by strokes of different lengths according to the desire of the user; in which there is no lost effort such as the overcoming of tension in springs and the like; and by which the natural walking motion of the user is employed in driving or propelling the vehicle.

The invention furthermore consists in the improvements in the parts and devices and in the novel combinations of the parts and devices herein shown, described or claimed.

In the drawing forming a part of this specification Figure 1 is a side elevation of a vehicle embodying my improvements, the dotted lines indicating the position assumed by the feet of the child operating the vehicle. Fig. 2 is a rear end elevation of the device shown in Fig. 1. Fig. 3 is an enlarged detail vertical section taken substantially on the line 3—3 of Fig. 2, one of the driving pinions being omitted in order to prevent confusion in the drawing, and Fig. 4 is an enlarged detail sectional view of one of the ratchets employed in driving the traction wheel.

In said drawing, 10 denotes the frame, which, as shown, is composed of two bars of iron or steel each of which is bent forwardly and inwardly and brought together at the front end as shown in Fig. 1, the two ends being secured to a bracket 11 to which is pivotally attached a steering handle 12, forked at its lower end and having mounted in the fork a steering wheel 13. The rear ends of the bars 10 forming the frame are supported on a shaft or axle 14, the shaft or axle rotating in ball bearings indicated conventionally at 15. To one end of the shaft 14 is keyed or otherwise secured a traction wheel 16 so that as the shaft is rotated said wheel is also rotated to propel the vehicle. At the opposite end of the shaft a second wheel 17 is provided which is free to rotate on the shaft to thereby facilitate the operation of the vehicle in going around curves. Extending transversely of the bars 10, 10 and having its ends mounted therein is a pivot or support 18 on which is pivotally mounted a platform or treadle 19, the latter being elevated above the support 18 by means of a block 20. On the top of the platform or treadle 19, at each end thereof, is preferably secured a piece of rubber or other suitable material 21 to prevent slipping of the operator's feet. Depending from the under side of the platform 19 at the rear thereof are two racks 22 and 23, the same being formed on arcs the centers of which coincide with the center of the pivot or support 18, said racks 22 and 23 being oppositely arranged as shown in Fig. 3 and being offset from each other as shown in Fig. 2. These racks are secured in any suitable manner to the under side of the treadle and are secured to each other at the bottom as by means of an integral transverse portion 24. Each of these racks 22 and 23 engages with a pinion 25, each pinion being formed on a flange 26 cast integral with a hub 27. The outer end of each hub 27 fits within a shell 28 pinned to the shaft 14, as indicated at 29, 29. The outer end of each hub 27 which is within the shell 28 is provided with a plurality of radial slots 30 in each of which is a steel ball 31. The inner surface of the shell 28 is provided with a plurality of recesses 32 arranged as shown in Fig. 4, the parts shown in Fig. 4 and above described forming a ratchet or clutch. The clutch shown in Fig. 4 is the one on the left of the center section line 3—3 of Fig. 2 and is the one operated by the rack 23 when the latter is moving upwardly. In this structure, as the pinion 25 is rotated clockwise by the rack 23 moving upwardly, the steel balls 31 will be thrown out of the slots 30 by centrifugal force and will engage in the recesses 32 and consequently effect a driving connection between the hub 27 and the shell 28. This will drive the traction wheel 16 forwardly. On the downward movement of the rack 23, the hub 27 will be rotated in the reverse direction and consequently the balls 31 will be forced back into the pockets 30 and thereby permit the hub 27 and its pinion to rotate counter-clockwise, freely. The ratchet and clutch mechanism on the right-hand side of the section line 3—3 as viewed in Fig. 2, is arranged opposite to that on the left-hand side, as will be clearly understood, so that it will come into operative position on the down stroke of the rack 22 and in this way effect forward rotation of the shaft 14.

In operation, the user will transfer his weight alternately from one foot to the other, thereby oscillating the treadle or platform, which acts as a lever of the first class, so that the shaft 14 will always be positively rotated forwardly during all oscillations of the treadle. The user may spread his feet apart to the extent indicated in Fig. 1 or place them nearer together or farther apart if desired to suit his convenience and to vary the leverage, and the stroke or amount of oscillation may be made as great or small as desired, since the stroke may be reversed at any point, and in practice it has been found that higher speeds may be obtained by using a short stroke in preference to a long stroke. When the desired speed has been obtained and the user desires to coast, this may be done by simply holding the treadle stationary in any position, inasmuch as the shaft 14 can rotate forwardly even when the treadle is stationary on account of the arrangement of the ratchets or clutches. It will also be noted that in addition to providing a direct drive, there is no possibility of the parts ever assuming a dead center position, nor is there any lost motion such as the overcoming of tension of springs to return any parts to normal or operative position.

Although I have herein shown and described what I now consider the preferred embodiment of my improvements, yet it will be understood that various changes and modifications may be made without departing from the spirit of the invention, and all such changes and modifications are contemplated as come within the scope of the claims appended hereto.

I claim:

1. A vehicle comprising a running gear provided with a traction wheel, means for steering said vehicle, a platform extending longitudinally of said vehicle and provided to oscillate about a transverse central axis, and driving connections between said platform and said traction wheel whereby to permit a child standing upon said platform with a foot on each side of its axis of escillation to propel the vehicle by shifting his weight backward and forward in the direction of travel.

2. A vehicle comprising a running gear provided with a traction wheel, a platform extending longitudinally of said vehicle and provided to oscillate about a transverse axis, driving connections between said platform and said traction wheel to permit a child standing upon said platform with a foot on each side of its axis of oscillation to propel the vehicle by shifting his weight backward and forward in the direction of travel, and a rotatable steering device positioned to be grasped by said child when in standing position upon said platform to steer the vehicle and to aid the child in obtaining his equilibrium.

3. A vehicle, comprising a running gear provided with a traction wheel, a platform pivoted centrally in said running gear and having foot rests for a child, located on opposite sides of its pivotal axis and connections between said platform and said traction wheel, such connections including clutches for driving said vehicle forward at every motion of said platform about its pivotal axis, whereby uneven oscillation of the platform results in a smooth, even and continuous forward movement of the vehicle and jerkiness of action which might dislodge the child is prevented.

4. A vehicle, comprising a running gear provided with a traction wheel, a platform pivoted centrally in said running gear and having foot rests for a child, located on opposite sides of its pivotal axis and connections between said platform and said traction wheel, such connections including clutches, a double rack depending from adjacent an end of the platform, one part of said rack engaging one of said clutches and the other part of said rack engaging the other of said clutches, each of said clutches serving to drive the traction wheel forward, one clutch on movement of the rack in one direction and the other clutch on movement of the rack in the other direction, whereby uneven oscillation of the platform results in a smooth, even continuous forward movement of the vehicle and jerkiness of action which might dislodge the child is prevented.

5. A vehicle, comprising a running gear provided with a traction wheel, steering means for guiding the vehicle, a platform extending longitudinally of the vehicle and provided to oscillate about a transverse central axis and driving connections between said platform and said traction wheel, whereby to permit a child standing upon said platform with a foot on each side of its axis of oscillation to propel the vehicle by shifting his weight backward and forward in the direction of travel, said connections serving to drive the vehicle ahead at each such motion of said child.

Signed this 28th day of April, 1914, in the presence of two witnesses.

ANDREW BENSON.

Witnesses:
 JOSEPH HARRIS,
 H. M. MUNDAY.